US012571443B2

(12) United States Patent  
Heinecke et al.

(10) Patent No.: US 12,571,443 B2  
(45) Date of Patent: Mar. 10, 2026

(54) METHOD TO PRODUCE CAST IRON BRAKE DISCS WITH HIGH CORROSION AND WEAR RESISTANCE

(71) Applicant: Oerlikon Surface Solutions AG, Pfäffikon, Pfäffikon (CH)

(72) Inventors: Rolf Heinecke, Baddeckenstedt (DE); Franco Arosio, Bad Saeckingen (DE); Ingo Lange, Zürich (CH)

(73) Assignee: Oerlikon Surface Solutions AG, Pfäffikon, Pfäffikon (CH)

( * ) Notice: Subject to any disclaimer, the term of this patent is extended or adjusted under 35 U.S.C. 154(b) by 266 days.

(21) Appl. No.: 17/768,159

(22) PCT Filed: Oct. 9, 2020

(86) PCT No.: PCT/EP2020/078469  
§ 371 (c)(1),  
(2) Date: Apr. 11, 2022

(87) PCT Pub. No.: WO2021/069695  
PCT Pub. Date: Apr. 15, 2021

(65) Prior Publication Data  
US 2022/0403901 A1    Dec. 22, 2022

Related U.S. Application Data

(60) Provisional application No. 62/912,891, filed on Oct. 9, 2019.

(51) Int. Cl.  
F16D 65/12      (2006.01)  
C23C 8/02      (2006.01)  
(Continued)

(52) U.S. Cl.  
CPC .............. F16D 65/127 (2013.01); C23C 8/02 (2013.01); C23C 8/32 (2013.01); F16D 65/0025 (2013.01);  
(Continued)

(58) Field of Classification Search  
CPC ................ F16D 65/0025; F16D 65/12; F16D 65/123–128; F16D 2065/1308; F16D 2200/0013; F16D 2250/0046  
(Continued)

(56) References Cited

U.S. PATENT DOCUMENTS 5,679,411 A      10/1997   Hoppe  
2011/0293849 A1*   12/2011   Lembach .............. F16D 65/127  
148/284

(Continued)

FOREIGN PATENT DOCUMENTS

CN        103174777 A      6/2013  
CN        103857475 A      6/2014  
(Continued)

*Primary Examiner* — Christopher P Schwartz

(57) ABSTRACT

Method for producing a mechanically and preferably machined cast iron or grey cast iron surface, in particular on a brake disc, with increased wear and corrosion resistance, characterized in that said surface is subjected to a water jet treatment—usually according to the so-called fluid jet process, which is adjusted so that it completely or at least partially clears the cavities opened by the machining, which contain a graphite inclusion surrounded by the basic structure, so that in the latter case the level of the graphite inclusion lies below the outer surface of the basic structure surrounding the cavity, whereupon a diffusion layer is applied by nitrocarburizing and an oxide layer is applied on the diffusion layer.

12 Claims, 7 Drawing Sheets

(51) Int. Cl.
  _C23C 8/32_ (2006.01)
  _F16D 65/00_ (2006.01)
  _F16D 65/02_ (2006.01)
(52) U.S. Cl.
  CPC .... _F16D 65/125_ (2013.01); _F16D 2065/1308_ (2013.01); _F16D 2200/0013_ (2013.01); _F16D 2250/0046_ (2013.01)
(58) Field of Classification Search
  USPC .................................................... 188/218 XL
  See application file for complete search history.

(56) References Cited

U.S. PATENT DOCUMENTS

| | | | |
|---|---|---|---|
| 2011/0297495 A1 | 12/2011 | Hanna et al. | |
| 2013/0153345 A1* | 6/2013 | Kuckert | F16D 65/127 |
| | | | 188/218 XL |
| 2014/0360820 A1 | 12/2014 | Harada et al. | |
| 2017/0122392 A1* | 5/2017 | Lembach | F16D 69/04 |
| 2020/0072306 A1* | 3/2020 | Rettig | C23C 28/3225 |
| 2023/0018275 A1* | 1/2023 | Giammarinaro | F16D 65/123 |
| 2024/0084430 A1* | 3/2024 | Arosio | F16D 65/0025 |

FOREIGN PATENT DOCUMENTS

| | | | | |
|---|---|---|---|---|
| DE | 102010048075 A1 * | 4/2012 | ............. | F16D 65/12 |
| DE | 102011056307 A1 | 6/2013 | | |
| DE | 102011089125 A1 | 6/2013 | | |
| DE | 102011089829 A1 | 6/2013 | | |
| DE | 102014004616 A1 | 9/2015 | | |
| DE | 102014015474 A1 | 4/2016 | | |
| DE | 102019210088 A1 * | 3/2020 | ............. | C09D 1/00 |
| EP | 0753599 B1 | 4/1999 | | |
| EP | 2741862 B1 | 9/2018 | | |

\* cited by examiner

Figure 4

| Product Characteristic | NEW SOLUTION | | CAST IRON | | FNC |
|---|---|---|---|---|---|
| | A | B | not painted | painted | |
| Corrosion resistance (NEW) [h] in SSNT | 10 | >300 | 1 | 120 (VW) | 180 |
| Corrosion resistance (used) [h] in SSNT | 10 | >300 | 0 | 0 | - |
| Durability of disc [T km] | 120 - 240 (2x + 4x) | | 60 | | 60 |
| Durability of corrosion protection (on brake rings) [km] | 2000 - TBD (SUV sporty drive - ECE pads) | tbd | 0 | 10 | ? |
| Oxide layer [μm] | 2 - 4 | | 0 | | 0 |
| White layer [μm] | 10 - 20 | | 0 | | - |
| NHT [μm] | 100 - 500 | | 0 | | ? |
| Performance AK M $\mu_{NOM} - \mu_{MIN}$ | 0,35 - 0,31 | | 0,37 - 0,32 | | 0,36 - 0,29 |
| Performance (fading) | better stability in 1st and 2nd fading | | | | |
| Performance (bedding / μ green ) | NAO: stable μ at braking # 5 - 10 ECE: stable μ at braking # 30 | | NAO: stable μ at braking # 30 ECE: stable μ at braking # 30 | | NAO: stable μ at braking # 10 |
| Roughness | Rp<5 | Rz<12 Ra<1,5 increase of Rz +2 ca | Rp<5 | Rp<5 | - |
| Brake dust | tbd | tbd | tbd | tbd | tbd |
| Hardness (surface) [HV5] | 300 - 450 | | 210 | | tbd |

METHOD TO PRODUCE CAST IRON BRAKE DISCS WITH HIGH CORROSION AND WEAR RESISTANCE

TECHNICAL FIELD

The invention concerns a method for producing a mechanically and preferably machined cast iron or grey cast iron surface, in particular on a brake disc, with increased wear and corrosion resistance.

Moreover, the invention concerns a particular use of a specifically tuned water jet process.

TECHNICAL BACKGROUND

The modification of the surface condition of cast iron components, such as brake discs for example, can combine the advantageous properties of cast iron as a core material, like "castability", affordability, good thermal conduction, sufficient stability at high temperatures with the advanced properties of the coating, such as improving the corrosion and wear resistance of the component.

Actual technical requirements of the brake disc market, above the already well known ones, are to provide a component with a durable corrosion resistance while reducing the particulate emissions to the environment which are the inevitable consequence of the braking process and the wear of the base material forming the brake disc. This is because the main source of particulate emissions in an electric car is no longer the engine but is produced by the brakes instead.

One of the state-of-the art solutions for improving the wear resistance of brake discs is a product known as the so-called "iDisc™". The iDisc™ is a brake disc of a well-known German automotive supplier. The friction surfaces of this iDisc™ are coated (normally spray coated) by a tungsten carbide-based layer as a top-coat on the braking surface. However, this solution is quite expensive and does not provide a fully satisfying corrosion resistance, at least not in the long term.

This is primarily due to the high thermal load imposed to the brake disc during the braking process, where the different thermal expansion coefficients of the materials used, such as the cast iron and the top coating, cause cracks in the coating. These cracks are the starting point of a corrosion, which develops as an "under-corrosion" of the base material finally causing the the delamination of the coating.

Alternative solutions such as surface modification processes (instead of providing a coating) include nitriding, carbonitriding or carbonitriding plus oxidation of the substrate by diffusion of nitrogen (N) and/or carbon (C) and/or oxygen (O) into the base material. Such processes are called for example gas nitrocarburizing (GNC), ferritic nitrocarburizing (FNC) or just nitriding processes. These processes provide the same or even improved properties of the substrate material by increasing its wear and corrosion resistance. The advantage of the said processes do not lead to a deposition of a real coating layer which could be prone to delamination.

For that reason, the said processes of nitriding, carbonitriding or carbonitriding and oxidation are a matter of choice for improving not only the wear but also the corrosion resistance of brake discs.

Due to the significantly different driving cycles of modern electric vehicles there is an increasing demand to improve the corrosion resistance. In a modern electric vehicle, regardless of whether it is a hybrid or fully electric vehicle, the brake disc is braked dry much less often in city traffic under humid conditions than in a vehicle with a classic internal combustion engine. This is because most of the braking power of an electric vehicle is provided by recuperation, i. e. by means of the electric motor itself, with no or little use of the brakes.

By now this demand cannot be sufficiently satisfied by the said processes of nitriding, carbonitriding or carbonitriding plus oxidation alone.

However corrosion inhibiting paints or "coatings", such as UV paint, Zn or Zn/Al paints can perform well in these new conditions (example, 120 h in standard DIN EN ISO 9227 salt spray test) but are easily abraded within a couple of braking procedures, and therefore offer no corrosion-free braking surface.

OBJECT OF THE INVENTION

It is an object of the invention to provide a cast iron surface and especially a grey cast iron surface, in particular a part of brake disc, with a further improved corrosion resistance.

Inventive Solution

According to the present invention, this objective is met by the following method for producing a mechanically and preferably machined cast iron or grey cast iron surface, in particular for a brake disc, with increased wear and corrosion resistance:

The inventors have detected that a particular water jet treatment of the said cast or grey cast iron surface—usually according to the so-called, per se already known fluid jet process—is able to drastically improve the corrosion resistance if a special adjustment of the water jet treatment is chosen. According to the invention the water jet is adjusted so that it completely or at least partially cleans out (if partially=reduces) the graphite inclusion being present in the cavities of the basic cast metal structure that have been opened by the machining. That means the graphite does not reach or emerge any longer at the surface. Typically, the said graphite inclusion is present in the shape of graphite lamellae or graphite balls.

Hereinafter a diffusion layer is applied by nitrocarburizing and an oxide layer is applied on the diffusion layer, both as formerly known in the state of the art.

The key of success that the inventors have realized is the following:

The graphite inclusion being present in the cavities of the basic cast metal structure that have been opened by the machining fuels corrosion as long as it extends directly into the area where the diffusion zone, created by nitrocarburizing and the subjacent, unaffected basic cast material meet.

Although more detailed investigations are still pending, it is assumed that an unfavourable electrochemical constellation occurs in this triple contact zone, which promotes rapid corrosion—in the broadest sense in the manner of a local electrical element.

The inventors have discovered that corrosion starts much more slowly when the cut cavities of the casting surface no longer contain graphite or contain so little graphite that the graphite level (the border of the graphite "bulk") in the respective cavity, viewed in the direction of the component core, is well further below than the diffusion layer created by carbonitriding.

The feature "well further below" can at least be regarded as being sufficiently fulfilled if, predominantly or essentially, the complete number of cavities, or at least the upper fourth, or better the upper third of the cavities is essentially freed from its native graphite load. The practice shows that in this case the presence of graphite is kept distant enough from the diffusion layer and surface which decisively reduce the corrosion process by delaying and slowing down the beginning of corrosion process.

Two technical effects are used here.

In the case of larger cavities, i.e. the ones with relatively large gap widths, sufficient removal of the graphite originally contained there leads also to the formation of a diffusion layer during nitrocarburizing within the cavity. The said diffusion layer extends down the side walls of the cavity in the direction of its bottom. This means that the side walls of the cavity also receive corrosion a protection as far as the diffusion layer extends downwards.

The inventors have found that the corrosion can be significantly delayed if the diffusion layer can be allowed to reach deep enough into the cavity. They have gotten aware, that it is important that the diffusion layer reaches into an area below the depth at which diffusion occurs starting from the outer surface of the brake disc surrounding the cavity, for example starting from the actual friction surface of the disc brake. This is only possible if and insofar the cavity is no longer filled with graphite.

For smaller cavities, i.e. those with relatively narrow gap widths, another effect is added. In the course of nitrocarburizing, there is, as already mentioned, a diffusion of material also into the surfaces that form the side walls of the cavity. This causes the material in the diffusion zone to expand in volume to a certain extent. As a result, like all cavities, cavities with narrow gap widths become narrower. In the case of cavities that are inherently narrow, however, this has the effect that they almost close up and thus decisively impede or slow down the penetration of liquid which cause the starting of the corrosion process.

These two mechanisms thus lead to a decisive delay in corrosion. However, this can only be achieved if the cavities are sufficiently and deeper freed from the graphite initially present in them. Superficial removal of the graphite from the cavities does not help here, since the corrosion would then spread very quickly from these cavities into the surrounding environment, where its destructive work begins.

The pulsed waterjet process per se is already state of the art. The pulsed waterjet is known from EP2741862B. The said EP2741862B1 is incorporated into this text by reference.

What was not known by now is that the pulsed water jet process is—with suitable parameter settings—a tool that allows a highly effective and selective graphite removal out of the cavities which have been cut by machining or sand blasting in a cast iron surface, essentially without any detrimental influence to the surrounding basic cast metal structure. Moreover it was not known or expected by now that a more than insignificant graphite removal out of the open cavities improves corrosion resistance drastically.

At this stage the inventive process, as far as it is applied to brake discs, can be summarized by somewhat other words:

At first a casting and preferably a fine turning of the cast iron brake disc takes place first, in the specific case lamellar cast iron (also called grey crat iron) is preferably used. This provides the right dimensions and geometry of the finished product.

Then a preferably pulsed waterjet processing takes place, with particular regards to corrosion relevant surfaces. At this point it is important to understand, that the cavities containing the graphite can not only be cut or opened by machining or turning but by sand blasting, too. So it can be useful treat braking surfaces, inner circumference and outer circumference or ventilation channels with the water jet. This will dramatically reduce the amount of graphite lamellae emerging till the surface and therefore boost the further nitrocarburizing performances.

Gas and/or plasma nitrocarburizing with post-oxidation this will provide the increased mechanical and corrosion performances.

Finishing of the brake disc can be undertaken hereinafter: marking and/or labelling, balancing, dimensional and quality control.

It is not possible to teach a general parameter set ready for starting the pulsed waterjet process however the nature of the cast metal iron surface to be treated may be. How the parameter sets have to be tuned in order to produce the inventive effect in regard to the individual cast surface has to be individually found out by making some simple application tests and subsequent analysing of the test result. This lies in the nature of things.

The main parameters to be tuned include the frequency of the pulse, which ranges from 10 kHz to 50 kHz, preferably at about 20 kHz, pressure of the water jet, between 550 and 800 bar, preferably between 600 and 700 bar with preferred distance of 30-70 mm to the surface, speed between 500 and 1200 m m/s and an offset between 2 and 10 mm.

In the specific case for surface activation prior the gas nitrocarburizing process, it has been found that some specific parameters are more relevant such as the nozzle diameter, typically < or ≤3 mm and angle, from 0 to 45° opening play an important role, directly affecting the overall water flow which affects the effectiveness of the treatment.

The pulsed waterjet process has the goal—and is tuned accordingly—to ideally not erode any pearlite and/or alfa ferrite metal grain, but only to erode the graphite being natively present in the cavities, also called "carbon agglomerates" (in the form of lamellae and/or globuli and/or mixed vermicular).

The process has to leave the surface as smooth as possible, ideally not or essentially not affecting the roughness (Ra and Rz) with exception to the spaces left empty from graphite.

A low roughness is needed to give the required friction coefficient (as state of the art-solutions), in fact the right tribology is delivered as a combination of adhesion and abrasion, and requires a high surface contact without micro-peaks (high roughness) that would negatively affect the adhesion-component of the friction.

Furthermore, an adhesive phenomenon is preferred in the case of coating layers, prolonging the lifespan of the product.

An abrasive layer provided by an ultra-hard pad material would only downgrade the wear of both components (disc and pads), not providing effective improvements from the state of the art-condition.

The mentioned empty spaces left from the graphite will be partially closes during the gas and/or plasma nitriding and/or carbonitriding (for example, IONIT G Ox), smoothening even more the surface.

For nitrocarburizing and subsequent oxidizing the process well described in EP0753599B1 is preferably used. This patent is incorporated into this text by reference. The process taught here is called IONIT OX.

➤ This patent has the goal of infiltrating N and C atoms in the surface, plus adding a post-oxidation, resulting in (seen in direction from free surface to core) an oxide layer (Fe3O4) which provides a higher corrosion resistance, > a white layer composed by Gamma' and Epsilon Fe—N grains, with good corrosion resistance and very good hardness (HV 5 300-450, compared to Cast Iron which is in the typical range of 200 HV5), > and a diffusion layer with an hardness of at least 50 HV5 points higher than the core material.

The Gamma and Epsilon nitrides, whose microstructure is wider than the Alfa ferrite, will result in a small growth of superficial volume, therefore helping in sealing the empty spaces left from the graphite, as described above.

It is preferred that said cast surface undergoes a plasma cleaning before nitrocarburizing starts. That way the growth of the diffusion layer effected by the nitrocarburization is most effective and free of defects.

Ideally in that the diffusion layer produced by nitrocarburization is subjected to a plasma treatment, preferably in the form of plasma activation, before the oxide layer is produced. Such a sputter cleaning of the gas-nitrided surface optimizes the crystallization conditions to achieve an adherent and finely structured $Fe_3O_4$ oxide layer. A compensation of the N and C losses during cooling is also achieved. ε nitrides result from this.

It is highly preferred to assist the water jet treatment by ultrasound. The superposition of the additional, pulsating energy of the sound waves in the ultrasonic range makes it much easier to loosen the graphite, which is embedded in the now cut cavities. This leads to a significantly deeper reaching removal of the graphite from the cavities.

The reason for this is that cavitation bubbles are formed when ultrasound is superimposed on the mouth or nozzle from which the water jet is ejected. These cavitation bubbles are thrown with the water jet against the surface of the brake disc. They implode there. This is accompanied by the well-known destructive effect of cavitation.

However, this destructive effect is not noticeable on the surrounding surface of the base metal, especially when the water jet is applied at an angle. This is because the water jet does not act long enough to damage the base metal. The situation is different with graphite. The graphite accumulations are very quickly shattered by the imploding cavitation bubbles and can then be discharged by the water jet.

It is highly preferred that that the water jet is directed/blasted along a non-rectangular angle to the surface to be treated. With other words: The water jet is not shot in the direction of the normal (not fully and preferably not essentially in direction of the normal) to surface to be treated.

If, for example, a friction surface is to be treated, then the main direction of the water jet is placed at an angle to the friction surface so that the water jet hits the friction surface—at least predominantly or even substantially with this angle. An ideal angle amounts to approximately 45° better at least 50° up to around 60°—instead of 90°+/−tolerance.

That way a more powerful water jet can be used which, if it frontally hit the surface of the brake disc, i. e. along the normal line erected on the surface to be treated, would develop so much kinetic impact that the surface quality and in particular the roughness of the metallic base material of the brake surface would be detrimentally affected.

The more powerful water jet can clear the cavities more effectively even if it is applied with a blast angle, as described.

Further possibilities how to modify the invention, further hints in regard to how the inventions works and which positive technical effects it produces are disclosed by the following description of the preferred embodiment

BRIEF DESCRIPTION OF THE DRAWINGS

FIG. 4 is a table providing results of the process of the invention in terms of corrosion behavior and other important parameters.

DETAILED DESCRIPTION OF THE PREFERRED EMBODIMENTS

In the preferred embodiment the iron-based component to which the invention is applied is a cast iron brake disc.

The brake disc is initially finely mechanically turned in order to reach the adequate Disc Thickness Variation (DTV), planarity and Lateral Runout (LRO) as known from the state-of-the-art. These primary mechanical finishing methods allow to reduce the chatter and judder of the brake disc during operation which are amongst the main cause of brake disc failures.

Afterwards it is treated with pulsed waterjet technology as explained in greater detail above, in particular in the area of its braking surfaces or other surfaces that are machined after casting.

Starting from the above-mentioned wider parameter ranges the following preferred values for the determining parameters used here, in this particular case, have been chosen as follows:

A pressure around 550 to 650 bar, a distance between water jet nozzle and target surface of the brake disc of at least around 30 mm, a nozzle with a circular opening having a nominal diameter of around 1.6 mm to 2.2 mm, extending outside from there with a cone angle of around 20°.

The above-mentioned parameters must be adjusted by tests according to the individual base material characteristics, i. e. in orientation to cast iron composition, hardness, grain distribution and overall brake disc geometry. The tests have been finished as soon as "microscopic" pictures showed that the cut cavities are sufficiently cleared from graphite according to what the invention teaches—while the other measurements have proven that there is not yet a worsening or more than an irrelevant worsening of the structure (roughness) of the surrounding surface.

At this point it has to be mentioned that the overall expected roughness should be—in particular for a for a brake disc—Ra<5 μm, preferably Ra<3 μm and Rz<12 μm, preferably Rz<10 μm.

Figure 1:
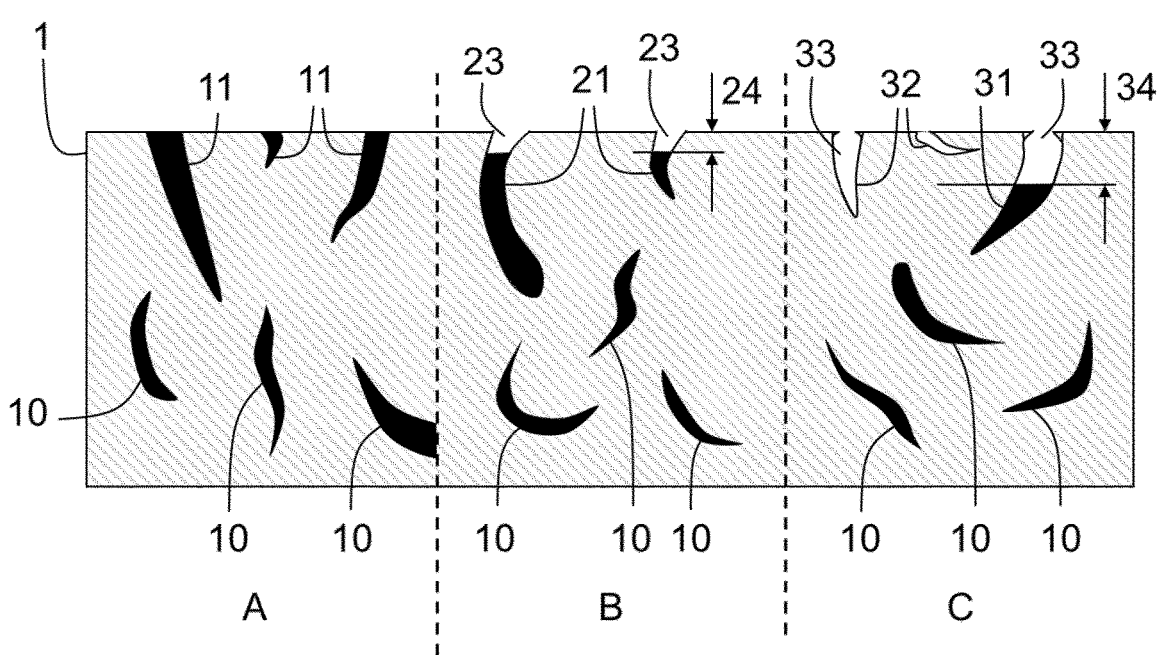
FIG. 1 shows results of the application of the process of the invention.

FIG. 1 shows what happens by the application of the inventive teaching. For this purpose, FIG. 1 shows a grey cast iron surface (1) in three sections A, B, C:

On the far left (A), one sees the original raw state of the substrate (1) with the graphite lamellae (11) cut (opened) due to prior machining of the surface which may preferably be understood as a friction surface of a brake disc. The graphite lamellae (10) which are deeper in the substrate remain unchanged by the machining process.

The middle section (B) shows a slightly but still insufficient thermal decarburization or (for the purpose of the invention) an insufficient cleaning with a soft, non-dangerous water jet. i. e. a water jet not strong enough to potentially impair the base metal surface surrounding the opened cavities (23), even if not properly directed to the surface, and not strong enough to provide a deeper clearing (24) of the cavities from the graphite (21) in it. If one would only do this before the nitrocarburization process, then the corrosive protection would be insufficient. This is because under the heat load of the first emergency braking (at the latest) the graphite filling the open cavities would be burned out. Then the "naked" side walls of the cavity which have not been nitrocarburized, lied open and quickly began to corrode, in an area very close to the friction surface of the brake disc.

On the right section (C) the lamellas are fully (32) or partially removed (31) by the application of the inventive process. The side walls of the cavities (33) lie free after removal of the graphite along more than ¼ or better ⅓ of the depth of the cavities (34). Due to that these lying free sidewalls of a bigger/broader cavity (as shown on the right-hand side) can be provided with a protective diffusion layer extending down along the cavity. Additionally, or alternatively a slimmer cavity, having a narrow access only, will be additionally closed (33) due to material expansion by diffusion, so that it becomes difficult for humidity to intrude.

The table presented in FIG. 4 proves for the expert who is familiar with the values commonly used for comparison, as they are always the relevant ones, the extremely beneficial effect of the invention in terms of corrosion behavior and other important parameters.

The far-left column (A) contains the data of a solution that has been—for investigation purposes—practiced by the applicant so far, but which is not in accordance with the invention. In this solution, the grey cast iron brake disc has been already cleaned with a pulsating water jet. However, in the past, in view of the dogma that the surrounding surface must not be negatively affected, the parameters of the water jet have not yet been adjusted in such a way that the water jet was sufficiently sharp to remove a significant amount of graphite from the cavities. These discs withstood the familiar water salt spray test for about 10 hours until visible corrosion appeared on the surface.

In the column to the right (B) are the data of the solution according to the invention.

Within the scope of this solution, the grey cast iron brake disc is subjected to a special treatment with a pulsating water jet adjusted according to the invention. The water jet is so sharp that there is a risk that the surface of the brake disc will be undesirably negatively affected if it is not applied with appropriate care. The water jet has cleared most of the cut cavities to more than a quarter of their depth. Thus, the effect described above in the introduction could occur in the cavities. As a result, the endurance of the brake disc in the standard water salt spray test has improved dramatically. Visible corrosion only occurred after 300 hours and more.

If one moves to the right in the table according to FIG. 4 (CAST IRON, not painted), the next thing found is a description of a normal grey cast iron disc, as has been the state of the art for decades.

If one continues in the table according to FIG. 4 to the right (CAST IRON, painted), then one finds there the description of a normal grey cast iron disk, which is equipped however here now with a modern, sprayed protective lacquer finish on zinc basis. As one can see, such a protective coating can achieve quite a lot from the corrosion point of view. But the decisive disadvantage is that the protective coating on the actual friction surfaces is very quickly worn away during daily braking action.

In the last column of the table in FIG. 4 (FNC), one will find the description of a gray cast iron disc, where the later oxidation, according to the invention, after nitrocarburizing was omitted.

Figure 2:
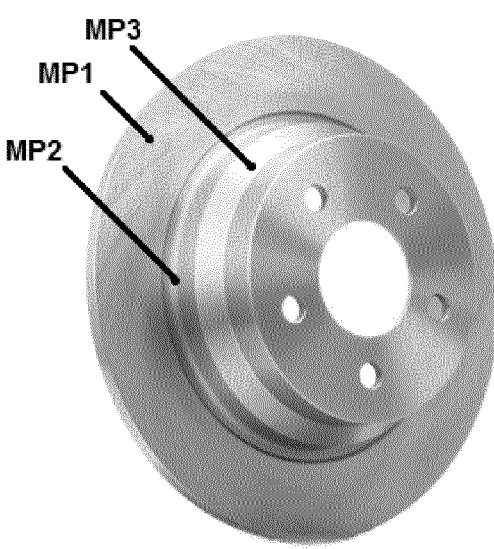
FIGS. 2A to 2D show a brake disc.
Figure 2:
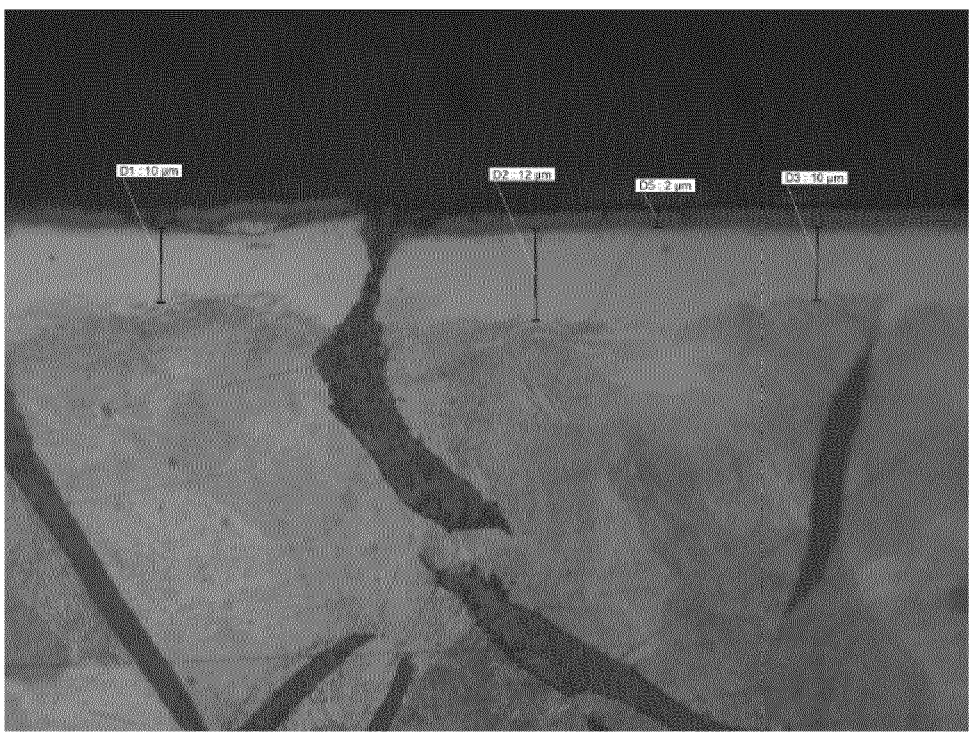
Figure 2:
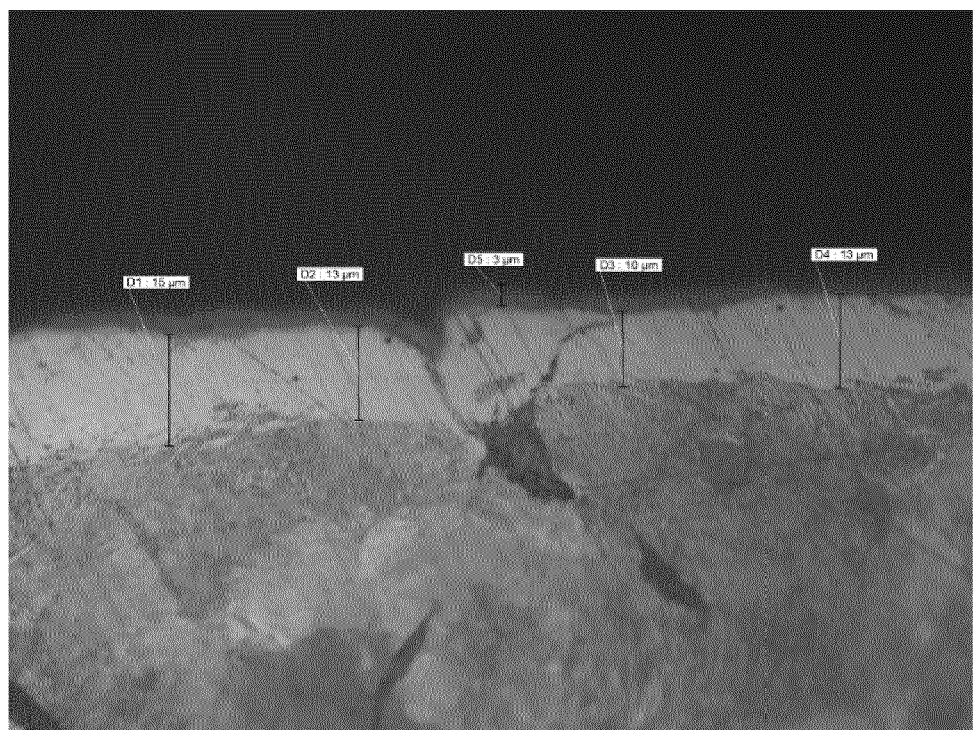
Figure 2:
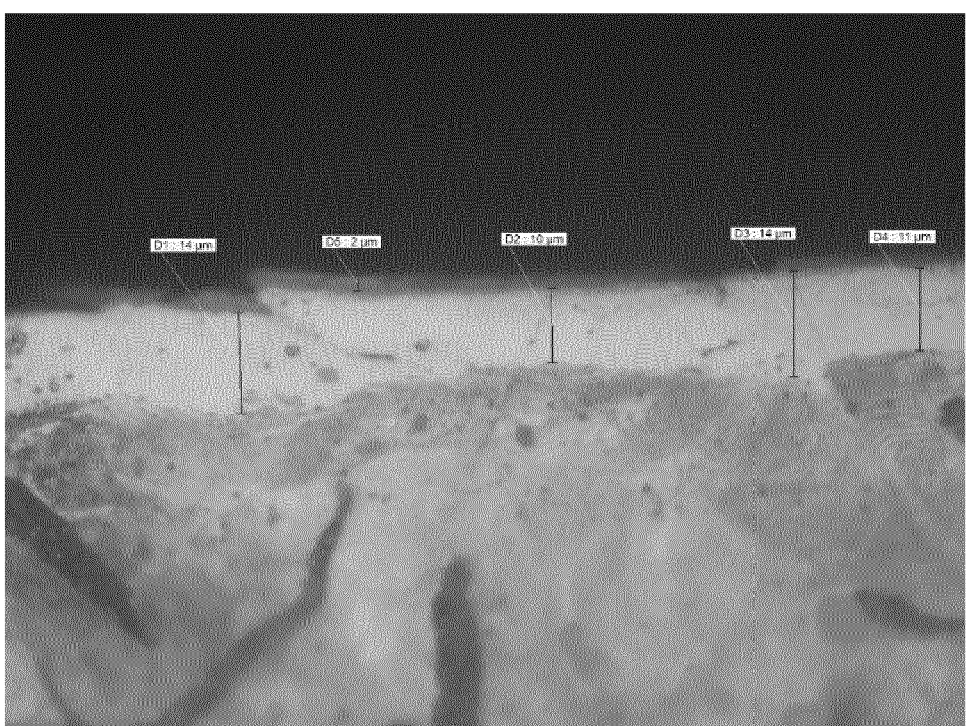

FIG. 2A to 2D show a brake disc FIG. 2A) and a cross section FIG. 2 B) of this disc with open plates after coating with IONIT OX. The figure shows in FIG. 2 C) partially interrupted lamellas after thermal treatment and subsequent IONIT OX coating. The figure in section FIG. 2 D) shows interrupted lamellas and lamella-free areas after water jet treatment and subsequent IONIT OX treatment.

IONIT OX is the diffusion layer created by nitrocarburization followed by plasma treatment and oxide coating, as taught by the above-mentioned patent.

Figure 3:
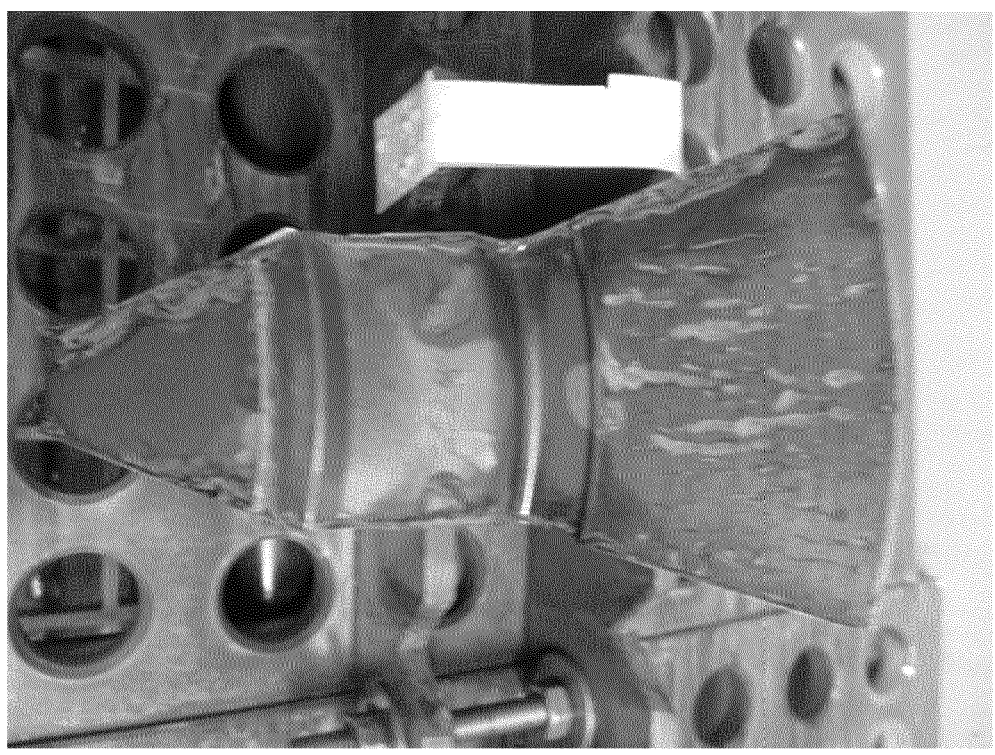
FIGS. 3A to 3D show the results and substrates after a 48-hour exposure in a salt spray environment.
Figure 3:
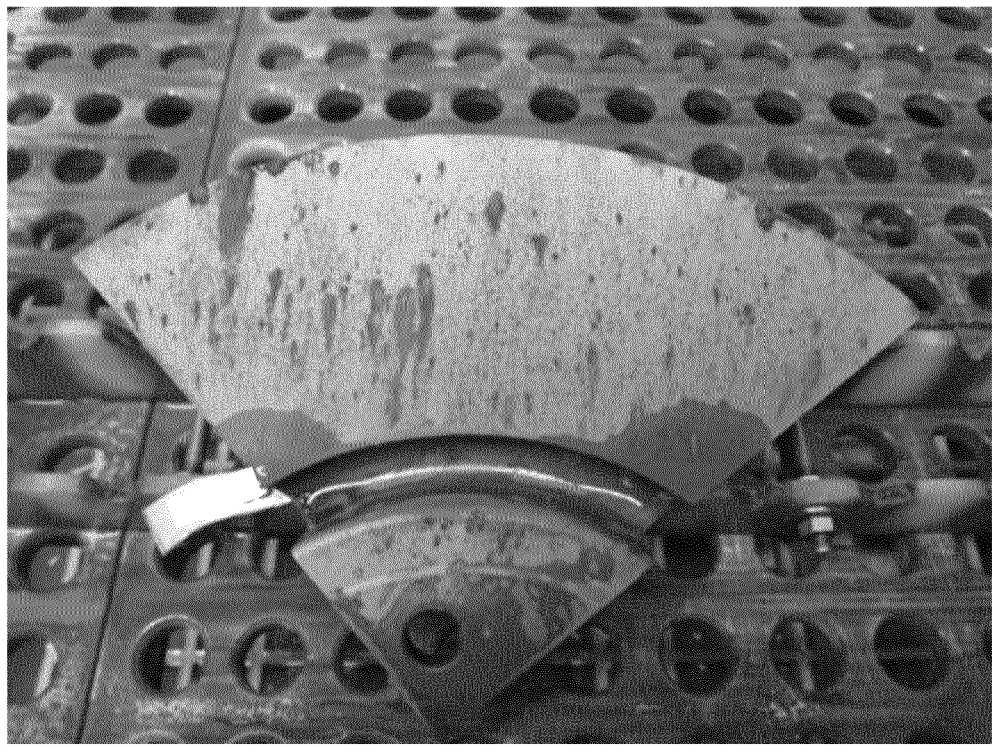
Figure 3:
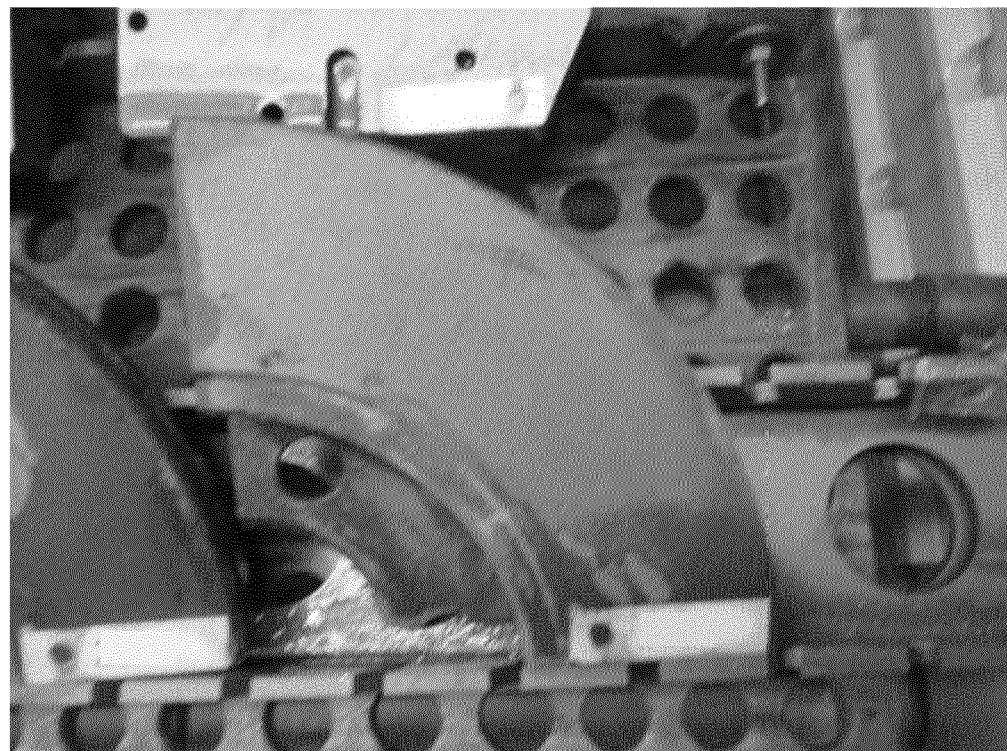
Figure 3:

FIGS. 3A to 3D show the results and substrates after an exposition of 48 hours in a salt spray environment: FIG. 3A) IONIT OX without pretreatment, FIG. 3 B) thermal pretreatment prior IONIT OX, FIG. 3 C) water jet pretreatment before IONIT OX and FIG. 3 D) shows the same substrate as in FIG. 3 C), namely water jet pretreatment prior IONIT OX after 240 hours of salt spray test and which remains visually still predominantly free of corrosion.

Figure 5:
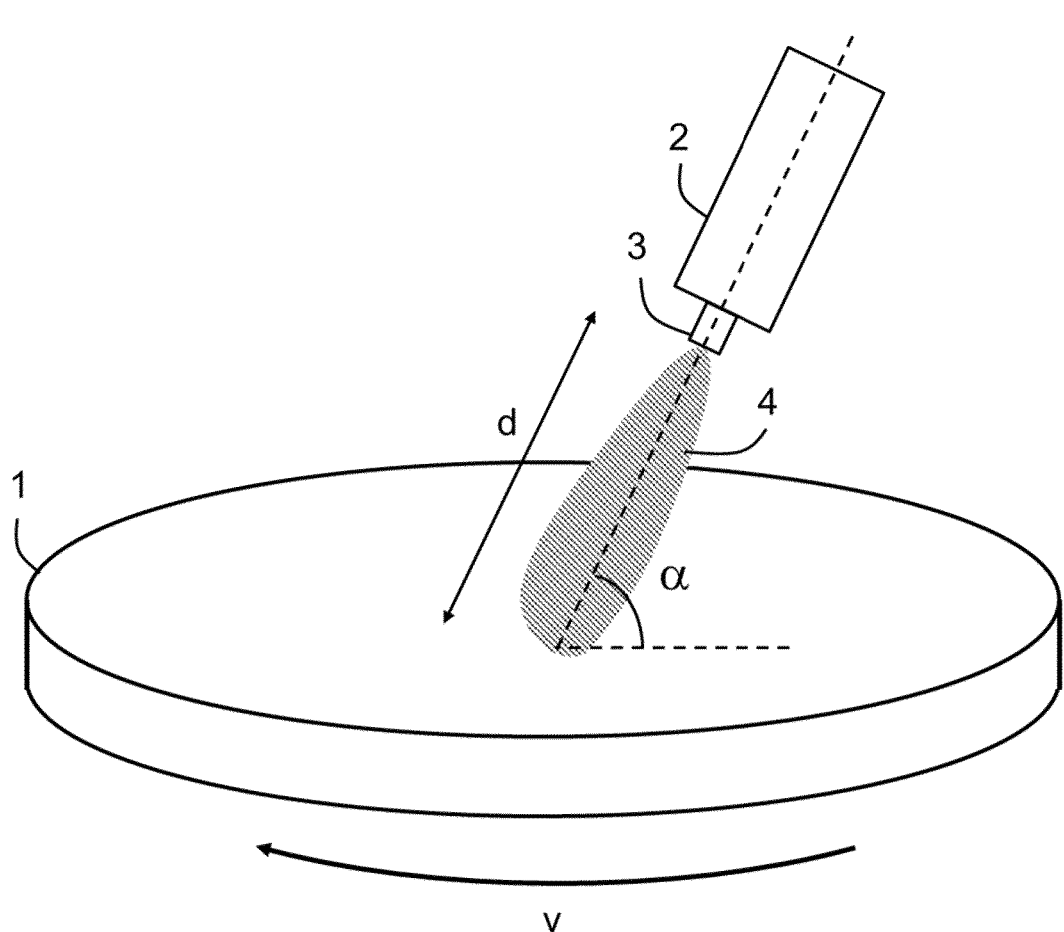
FIG. 5 shows the typical configuration for the water jet activation process prior to applying the IONIT OX process according to the present invention.

FIG. 5 shows the typical configuration for the water jet activation process prior applying the IONIT OX process according to the present invention. This includes the substrate to be processed, illustrated by a brake disc (1), the water jet gun (2) and the nozzle (3). Here the water jet gun (2) is placed at a certain nozzle-substrate distance (d) with respect to the surface of the brake disc and tilted at a certain angle, so that the axis of water jet gun and the plane of the surface of the brake disc forms the angle (a). The water jet is represented by (4) in the figure. During the surface activation by the water jet, the brake disc is rotated at a certain rotating speed (v) at the same time as the water jet gun in two axis which are in a plane that is parallel to the surface of the brake disc. This allows to process the whole surface of the brake disc.

After pulsed waterjet process for lamellae erosion, the brake disc is going through a heat treatment process at temperatures of approximately 500° C. to 590° C., preferably between 570° C. to 580° C. and is subsequently subjected to a nitrocarburization process in a controlled atmosphere, usually at a pressure close to the atmospheric pressure of about 1030 mbar, and exposed to gases such as ammonia, nitrogen and carbon dioxide. The respective gas flows are adapted depending on the cast iron base material and weight of the brake disc component. The nitrocarburization process is favorable for iron-based material as it forms a harder material of Fe—NC over the whole exposed surfaces of the component.

The component afterwards is cooled down at a lower temperature of about 500° C. where it can optionally go through a plasma activation process at work pressures below 2 mbar, preferably between 1 to 2 mbar or directly through the additional optional oxidation process. The optional plasma activation process is described more in detail elsewhere U.S. Pat. No. 5,679,411A whereas the whole process including the latter process of additional oxidation is better known as gas nitrocarburization and oxidation or GNC OX.

The optional plasma activation allows an additional cleaning of the surface by sputtering and also sputter-ions produced during this process create lattice defects on the surface which contribute to a final denser oxide layer after the oxidation process. The resulting nitrocarburizing layer or diffusion zone are at least 15 μm thick and the oxide layer at least 2 μm. The additional optional thin oxide layer of magnetite (Fe3O4) is a continuous and a closed layer which is produced over the whole component surface, allowing an improved corrosion resistant of the component.

The invention claimed is:

1. A method for producing a mechanically and machined cast iron or grey cast iron surface on a brake disc, resulting in increased wear and corrosion resistance, comprising:

subjecting a surface of a cast iron or grey cast iron substrate to a pulsed water jet treatment, wherein a pulsed water jet is adjusted so that the water jet completely or at least partially clears at least an upper fourth of cavities opened by the machining, which cavities contain a graphite inclusion surrounded by a basic structure, so that when the pulsed water jet at least partially clears at least the upper fourth of cavities, a level of the graphite inclusion lies below an outer surface of the basic structure surrounding the cavity and as a result the basic structure surrounding the cavities is not eroded, applying a diffusion layer by nitrocarburizing; and applying an oxide layer on the diffusion layer.

2. The method according to claim 1, wherein the diffusion layer produced by nitrocarburization is subjected to a plasma treatment before the oxide layer is produced.

3. The method according to claim 2, wherein the plasma treatment is in the form of plasma activation.

4. The method according to claim 1, wherein the process of carbonitriding is controlled at least in part by at least one of the parameters selected from the group consisting of: heating time, holding time, a temperature during the carbonitriding phase, subsequent cooling time and a temperature reached after the cooling time has elapsed, and subsequent oxidation time and a temperature held or driven during this time.

5. The method according to claim 4, wherein the process of oxidation is also controlled at least in part by at least one of the parameters selected from the group consisting of: heating time, holding time, the temperature during the carbonitriding phase, the subsequent cooling time and the temperature reached after the cooling time has elapsed, and subsequent oxidation time and the temperature held or driven during this time.

6. The method according to claim 1, comprising carrying out a plasma cleaning of said cast surface before nitrocarburizing.

7. The method according to claim 1, wherein the water jet treatment is assisted by ultrasound.

8. The method according to claim 1, wherein the water jet is directed/blasted along a non-rectangular angle to the surface to be treated.

9. A method of using a pulsed water jet process, comprising:

using a pulsed water jet treatment to fully or partially clear at least an upper fourth of a brake disc's cavities opened by machining, which cavities contain a graphite inclusion surrounded by a basic structure, so that when the water jet treatment at least partially clears at least the upper fourth of the cavities, a level of the graphite inclusion lies below an outer surface of the basic structure surrounding the cavity so that the basic structure surrounding the cavities is not eroded, in order to prepare the brake disc for nitrocarburization.

10. The method according to claim 9, comprising using the pulsed water jet treatment to prepare the brake disc for nitrocarburization and subsequent oxidation.

11. A brake disc made from grey cast iron having at least at its friction surfaces cavities opened by prior machining and originally filled with graphite, wherein at least an upper fourth of the cavities is fully or partially cleared from the graphite that was in it in a manner that does not cause deposit of a solid blasting material or ash within the cavities and the brake disc is nitrocarburized, and wherein a base structure surrounding the cavities has a roughness $Ra < 5$ μm and $Rz < 12$ μm and is not eroded.

12. The brake disc according to claim 11, wherein the brake disc is also oxidized.

* * * * *